(12) United States Patent  
Kitchloo et al.

(10) Patent No.: US 7,726,808 B1
(45) Date of Patent: Jun. 1, 2010

(54) RIMLESS SPECTACLE LENS BORE POLISHING METHOD AND APPARATUS

(75) Inventors: Paresh Kitchloo, North Attleboro, MA (US); Russell F. Weymouth, Jr., Charlton, MA (US)

(73) Assignee: Gentex Optics, Inc., Simpson, PA (US)

( * ) Notice: Subject to any disclaimer, the term of this patent is extended or adjusted under 35 U.S.C. 154(b) by 0 days.

(21) Appl. No.: 12/469,331

(22) Filed: May 20, 2009

(51) Int. Cl.
G02C 1/00 (2006.01)
B24B 49/00 (2006.01)

(52) U.S. Cl. .......................... 351/110; 451/41; 451/42
(58) Field of Classification Search ................. 351/110, 351/153, 41, 158; 451/41, 42, 43, 44, 45, 451/46, 240, 255, 256
See application file for complete search history.

(56) References Cited

U.S. PATENT DOCUMENTS

| 4,685,781 A | 8/1987 | Wiedmann et al. |
| 5,684,559 A * | 11/1997 | Lin ............................. 351/110 |
| 5,835,183 A | 11/1998 | Murai et al. |
| 6,024,445 A | 2/2000 | Conner et al. |
| 6,050,685 A | 4/2000 | Lin |
| 6,199,981 B1 | 3/2001 | Chao |
| 6,428,166 B2 * | 8/2002 | Tiberghien ................. 351/153 |
| 6,752,893 B2 | 6/2004 | Frieder, Jr. |
| 6,790,124 B2 | 9/2004 | Shibata |
| 6,821,189 B1 | 11/2004 | Coad |
| 7,040,752 B2 | 5/2006 | Haverkamp |
| 2004/0247254 A1 | 12/2004 | Shouji et al. |
| 2006/0008211 A1 | 1/2006 | Kono |
| 2007/0065073 A1 | 3/2007 | Ishii et al. |

OTHER PUBLICATIONS

Monaham Filaments. Abrasive Fibers: Abrasive Filament Properties. Abrasive Brochure. www.monahanfilaments.com. (6 Pages).

* cited by examiner

*Primary Examiner*—Hung X Dang
(74) *Attorney, Agent, or Firm*—Keusey & Associates, P.C.

(57) ABSTRACT

A method and apparatus for improving the performance of rimless spectacle lenses. An abrasive wire is provided for polishing bore holes which are drilled in lenses. The abrasive wire includes a wire substrate with abrasive particles embedded along its length. The wire and particles are dimensioned for threading through the bore hole and allowing space to perform a soft-filing operation. By polishing the micro cracks formed during drilling, propagation leading to lens failure which arises from spectacle use can be reduced.

27 Claims, 5 Drawing Sheets

RIMLESS SPECTACLE LENS BORE POLISHING METHOD AND APPARATUS

BACKGROUND OF THE INVENTION

1. Field of the Invention

The present principles relate to a method and apparatus for polishing the inner surface of a borehole in a rimless spectacle lens.

2. The Prior Art

A popular trend that has been emerging in recent years with regard to eyewear has been the prevalence of rimless spectacles. The distinguishing feature of rimless spectacles is that supports for the spectacles, most notably the temples and nose-bridge, are directly attached to the eyeglass lenses via a screw, mounting pin or the like without utilization of a lens frame. A common problem associated with rimless spectacles is the incidence of cracking and crazing in the lens or coating due to forces applied by screws or mounting pins attaching supports to the lens. Over time, as a result of prolonged use, the cracks may spread to the outer edge of the lens, not only creating an unattractive appearance, but also requiring replacement due to a lack of structural integrity.

One approach to reducing the incidence of cracking flaws associated with rimless spectacles is to employ lenses composed of materials with an increased resistance to such flaws. See, e.g., Yang, et al., U.S. Pat. No. 7,135,545. However, there is a need for a simple and economical method for reducing the prevalence of cracking and crazing in rimless spectacles that may be applied to all lens materials, including those that are already known and commonly used.

SUMMARY OF THE INVENTION

It is an object of the present invention to provide a simple method and apparatus for improving the performance of rimless spectacle lenses.

It is another object of the present invention to minimize the deleterious effects of micro-cracks which arise during drilling of boreholes in lenses.

It is a further object of the present invention to minimize the deleterious effects of crazes which arises during drilling of boreholes in lenses.

It is another object of the present invention to polish boreholes which are formed in polycarbonate lenses.

These and other related objects are achieved according to an embodiment of the invention by a method for producing a rimless spectacle lens with a resistance to stress-induced cracking by first providing an optical grade thermoplastic lens. A borehole is drilled in the lens. The borehole surface is soft-filed with an abrasive wire. The abrasive wire includes a wire substrate and abrasive particles embedded on the wire substrate. The soft-filing step renders a surface texture with a higher degree of consistency and resilience to torque stress applied on the borehole surface, thereby reducing the incidence and propagation of cracks in the lens.

The objects are further achieved according to another embodiment of the invention which provides an abrasive wire for use in filing an inner-surface of a borehole within an optical grade, thermoplastic lens including an edged, elliptical periphery, that is employed in rimless spectacle construction. The borehole and a nearest periphery of the lens define a land having a length that is at most 20% of a maximum lens length of the lens. The abrasive wire includes a wire substrate and abrasive particles embedded on the wire substrate adapted to soft-file a borehole surface within a thermoplastic lens. The abrasive particles have a hardness that is greater than the hardness of the lens material.

The objects are further achieved according to another embodiment of the invention which provides an abrasive tool in combination with a workpiece employed to produce a rimless spectacle lens with a resistance to stress-induced cracking. The workpiece is an optical grade plastic thermoplastic lens including a borehole. The abrasive wire has a linear configuration that is dimensioned to allow the abrasive wire to be drawn through the borehole in an axial direction and to enable soft-filing of a linear section of the borehole. The abrasive wire includes a wire substrate and abrasive particles embedded on the wire substrate.

BRIEF DESCRIPTION OF ME DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

The present principles are directed to a method and apparatus for polishing the inner surface of boreholes in rimless spectacle lenses to reduce the incidence of cracks and crazes. The cracking flaws associated with rimless spectacles are often exacerbated and proliferated because of coarse protrusions and loose particles on the inner surface of the boreholes in which screws or mounting pins are inserted. An aspect of the present principles includes soft-filing the inner surface of rimless spectacle lens boreholes with an abrasive thread, floss, or wire to remove coarse imperfections and provide a smoother surface with a higher degree of consistency and resilience to torque stress, thereby reducing the initiation and spread of cracks in the lens or coating.

Figure 1:
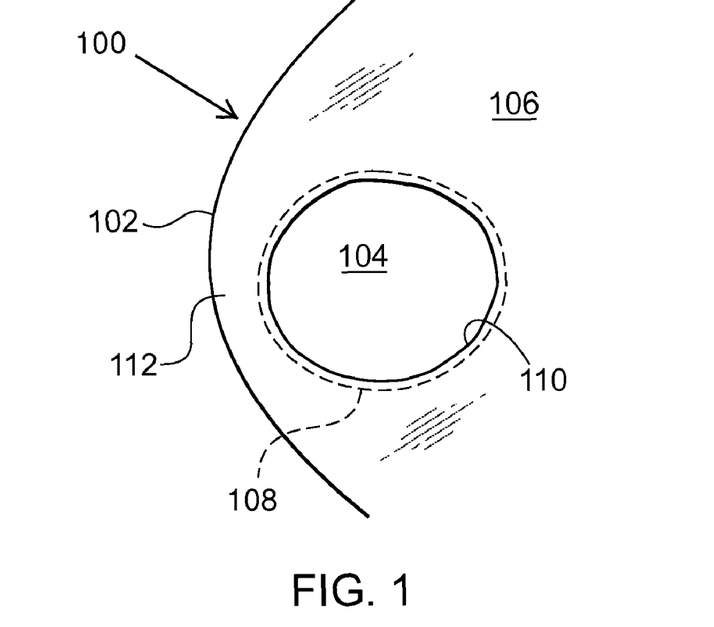
FIG. 1 is a top plan view of a borehole in a rimless spectacle lens including a section susceptible to micro-cracks and crazes as a result of drilling the borehole.
Figure 2:
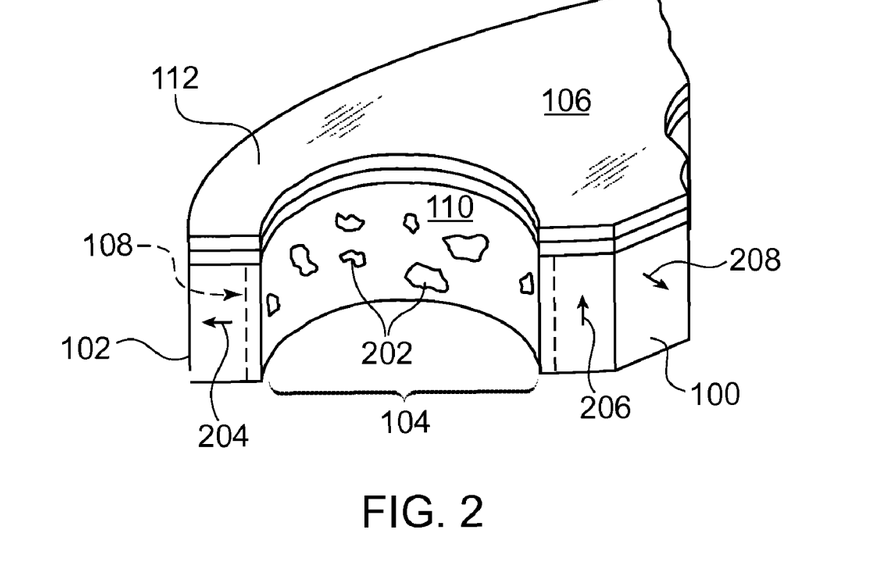
FIG. 2 is a perspective cross-sectional view of the borehole illustrating cracks, protrusions, indentations and loose particles with an indication of the propagation direction of cracks and crazes through the lens or coating.
Figure 3:
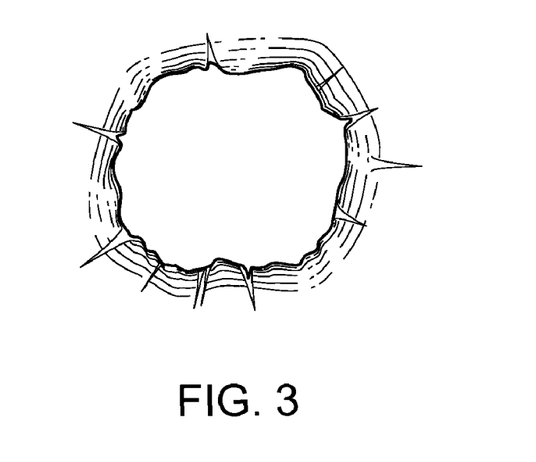
FIG. 3 is another example of drill-induced micro-cracks and crazes around a borehole in a lens.

FIGS. 1 & 2 illustrate a typical rimless spectacle lens 100, with an outer edge 102. The outer edge 102 is formed by edging the lens periphery to create an elliptical shape, as is known in the art. A borehole 104 is drilled in the lens in an appropriate position to provide a socket for insertion of a mounting pin or a screw (not shown), which is employed to attach a temple or a nose bridge to the lens. Drilling the borehole inevitably leads to some degree of damage to the lens, including the formation of micro-cracks 202. An example of micro-cracks within a rimless spectacle lens resulting from drilling a borehole is depicted in FIG. 3. Additionally, the drilled borehole inner-surface 110 also commonly contains residual clusters of loose material, coarse protrusions, and indentations 202.

Upon insertion of a mounting pin or screw, the protrusions and loose material 102 act as traction points on the surface of the pin or screw. Through normal use of the spectacle lenses, the mounting pin or screw exerts torques and other forces on the inner surface 110, which are particularly concentrated on the protrusions and loose material 202. The focused torque stress on the protrusions 202 is often a main cause of propagation of micro-cracks and crazes through an area 108 around the borehole in the lens. Over time, as a result of flexing and movement of spectacle supports, such as a temples or a nose bridge, micro-cracks widen and spread from the borehole throughout the lens. The cracks may propagate radially, 204, towards the outer edge of the lens 102 in a land 112, and may also extend in the lens 100 internally in the direction labeled 208. In addition, the cracks and crazes may develop in the direction labeled 206 through outer lens coatings 106.

Figure 4:
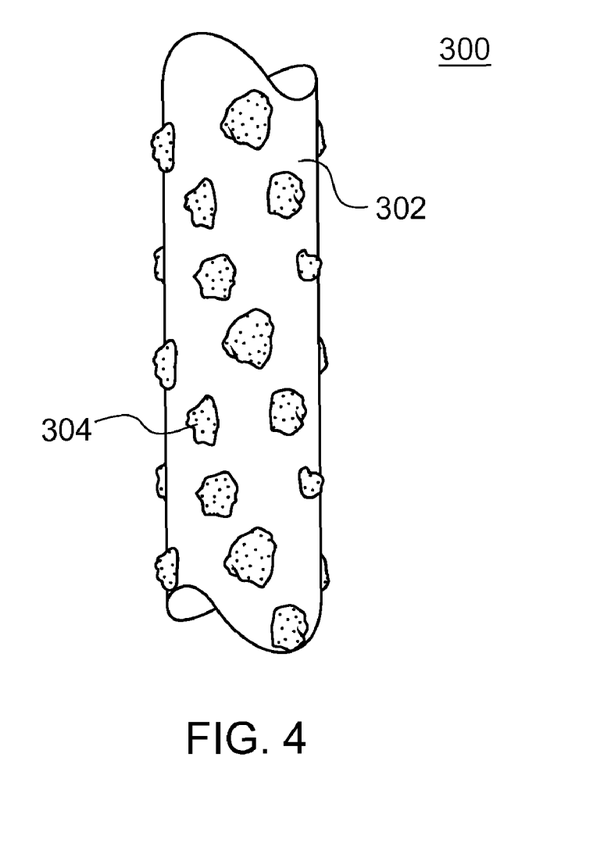
FIG. 4 depicts an implementation of an abrasive wire employed on the inner-surface of a borehole to reduce the incidence and propagation of cracks throughout a rimless spectacle lens.

To reduce the incidence and propagation of micro-cracks and flaws throughout the lens, one aspect of the present principles includes soft-filing the borehole surface to remove coarse protrusions and loose material. Soft-filing provides a surface texture with a higher degree of consistency and resilience to torque stress applied by a mounting pin or screw, as the prevalence of traction points on the borehole surface is reduced. An implementation of the abrasive wire employed in accordance with the present principles is illustrated in FIG. 4, depicting a flexible, wire substrate 302, including abrasive particles 304 embedded in, or adhered on, its surface.

References to a "wire" substrate means a substrate having dimensions like a wire, thread, filament, fiber or floss. Substrate 302 is made from a synthetic thermoplastic compound. Suitable compounds will be strong and flexible, like nylon or nylon blends, for example blends of different types of nylon or nylon/PBT fibers. PBT stands for polybutylene terephthalate. Based on application (cleaning, polishing, etc), the cross-section of the fibers can be round, flat, hollow, and even star-shaped, for example. The cross-sectional shape can be altered to vary the surface area of the fiber and to a limited extent, the grit loading. To impart physical strength, the extruded fiber is usually stretched at least 2 or 3 times its length. In practical testing, the fibers were stretched according to a ratio of 1:6. In addition, the fibers are crimped into a wavy structure to improve their efficiency. Several smaller fibers can optionally be bundled together for a cleaning or polishing operation.

In a preferred embodiment the substrate material is nylon or a nylon blend. Nylon is a commercially viable option due to both economics and chemistry. Nylon is a commodity resin with well established economies of scale and broad processing windows. Also, Nylon can be processed into fibers by a stretching process which provides strength as the polymer chains are aligned during stretching. By way of non-limiting example, fibers could be made from Nylon 6, 6/6, 6/10, 6/12 and combinations thereof. Nylon 6 and 6/6 are at the lower end of the price range and therefore represent the most economical choice. Nylon 6/10 and 6/12 are slightly more expensive, but are good choices if low water absorption is desired. Essentially, the economics, the required strength properties, and the ease of processability will dictate the choice of materials. As mentioned above, nylon and nylon blends can readily be extruded into a variety of cross sectional shapes. Nylon can be readily stretched to improve strength characteristics. Nylon can be readily crimped. If the fibers are to be used in high heat environments, the material may oxidize prematurely and become brittle. For such applications, the material properties of the nylon may be improved by the addition of a heat stabilization package which reduces the effects of thermal degradation.

The abrasive particles comprise a grit material that will be combined with the substrate to form an abrasive filament. In general, grit material which has a hardness greater than the optical lens material will be suitable. More particularly, the grit material should possess a hardness greater than an optical hard coat. For optical hard coats having a Mohs Hardness of 4-5, an appropriate grit material would have a Mohs Hardness of greater than 7. In one embodiment, the grit material has a Mohs Hardness in the range from about 7.5 to about 9.5. Exemplary materials include Silicon Carbide (SiC), Aluminium Oxide (Al2O3), Industrial diamond powder, natural diamond powder, and combinations thereof. In a preferred embodiment, the grit material is Aluminum Oxide or Silicon Carbide. Aluminum Oxide has a density of 4; Mohs Hardness of 8.8 to 9.0 and is characterized as very hard. Silicon Carbide has a density of 3.2; Mohs Hardness of 9.5 and is characterized as exceedingly hard and sharp. Diamond has a Mohs Hardness of 10.

The grit size can vary from below 10 or above 1000. Grit Size is defined as the nominal size of abrasive particles corresponding to the number of openings per inch in a screen through which the particles can just pass. At the low end, grit size less than 120 can be used for physical removal of lens or coating material. In the middle portion of the range, grit size between about 180 to about 240 can be used for light abrasive cleaning. In practical testing, grit size in the range of 320 to 500 was effective in polishing the bore holes by smoothing out rough areas which are created during a typical lens drilling operation. As a weight percent of grit to the total abrasive filament, the grit may be present in an amount from about 20% to about 35%. In practical testing, the grit was present in a range between about 26 and about 30%.

Figure 5:
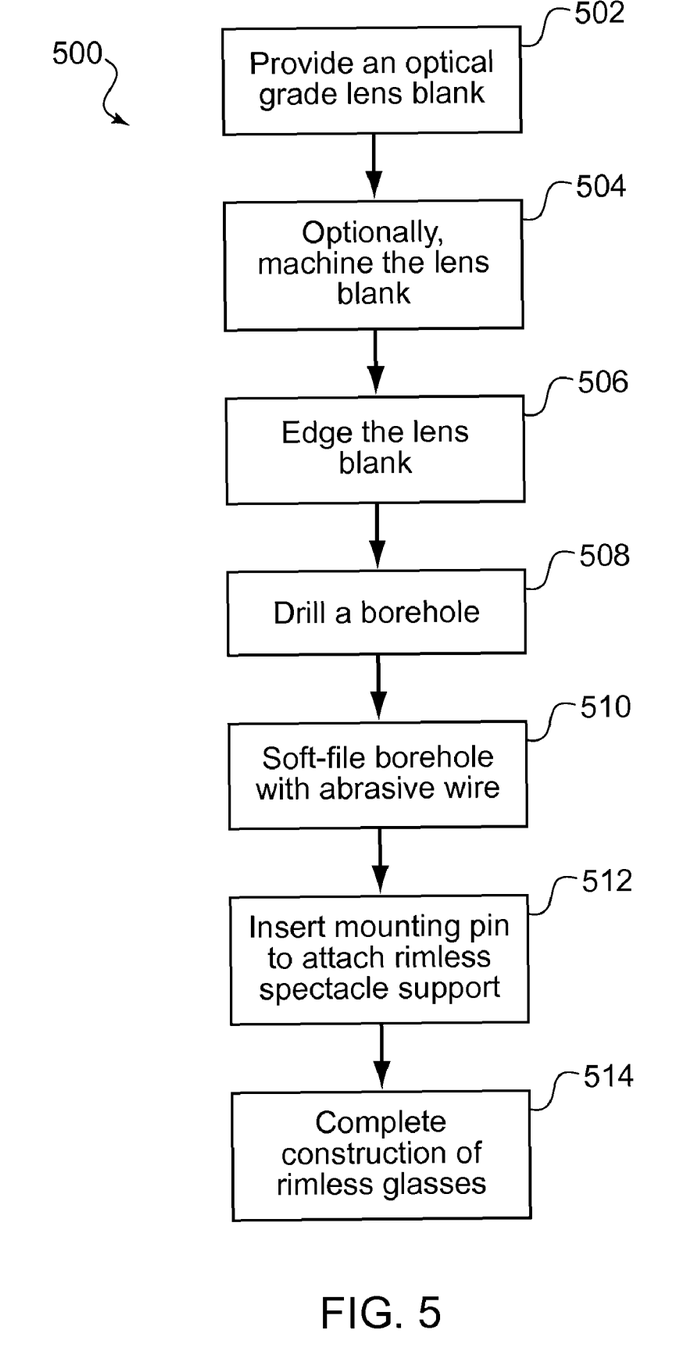
FIG. 5 provides an example of a method for constructing rimless spectacles with an increased resilience to stress-induced crack propagation in accordance with the present principles.

A method 500 of producing a rimless spectacle lens with a resistance to stress-induced cracking utilizing an abrasive wire in accordance with an aspect of the present principles is illustrated in FIG. 5. The method begins by providing an optical grade lens blank, 502, which is often circularly shaped and composed of a thermoplastic material. Additionally, the lens blank may be one of two types, which are referred to here, for present purposes, as either "semi-finished" or "finished." A "semi-finished" lens blank is a lens with only one surface that is finished to a specific curve. To construct a spectacle lens, the semi-finished lens blank must be machined 504 to form a second, specific curved surface and thickness in accordance with the particular power, prescription (Rx) or other optical feature desired for the spectacle lens. In contrast, a "finished" lens blank, is pre-configured to have a particular thickness and power or Rx with two finished, curved surfaces. A finished lens blank need not be machined to form a second curved surface.

After machining the lens blank, if necessary, the lens is then edged, 506, according to processes known in the art to form an elliptical outer periphery 102, consistent with the desired shape of the final lens. Upon edging the lens, boreholes are drilled 508 in positions that are suitable for mounting temples or nose bridges. In rimless spectacle lenses, the boreholes are commonly drilled near the outer edge 102 to form a short land 112 between a borehole and the outer edge 102.

The boreholes are then soft-filed 510 by inserting an abrasive wire into the borehole opening and rubbing the wire along the surface of the borehole to remove any residual loose materials and to strip any coarse protrusions. After providing a smoother borehole inner-surface by employing the abrasive wire, a screw or mounting pin is inserted into the borehole 512. To complete the construction of rimless spectacles 514, supports for the rimless spectacles, such as temples and a nose bridge, are attached to a pair of lenses processed in accordance with the above-recited method via screws or mounting pins inserted into lens boreholes.

Figure 6A:
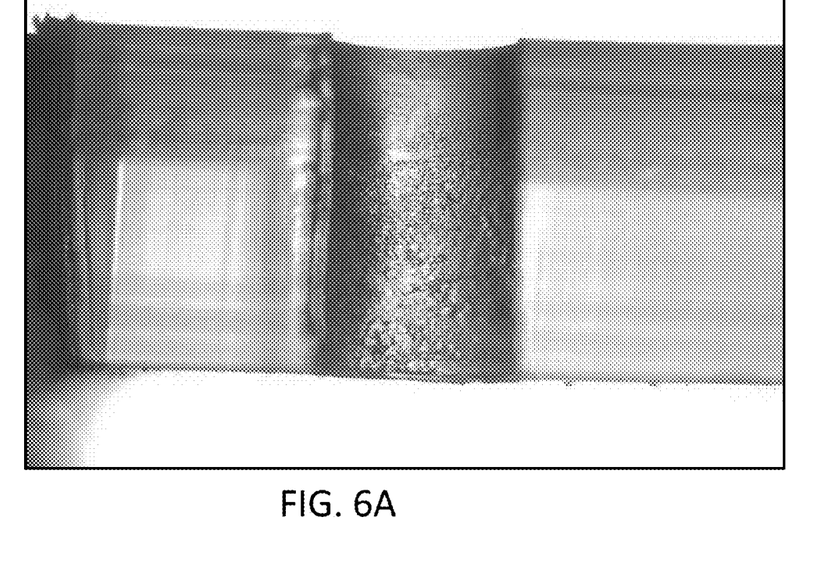
FIGS. 6A and 6B are micrographs showing a borehole in a lens, with FIG. 6A showing the borehole before polishing and FIG. 6B showing the borehole after polishing.
Figure 6B:
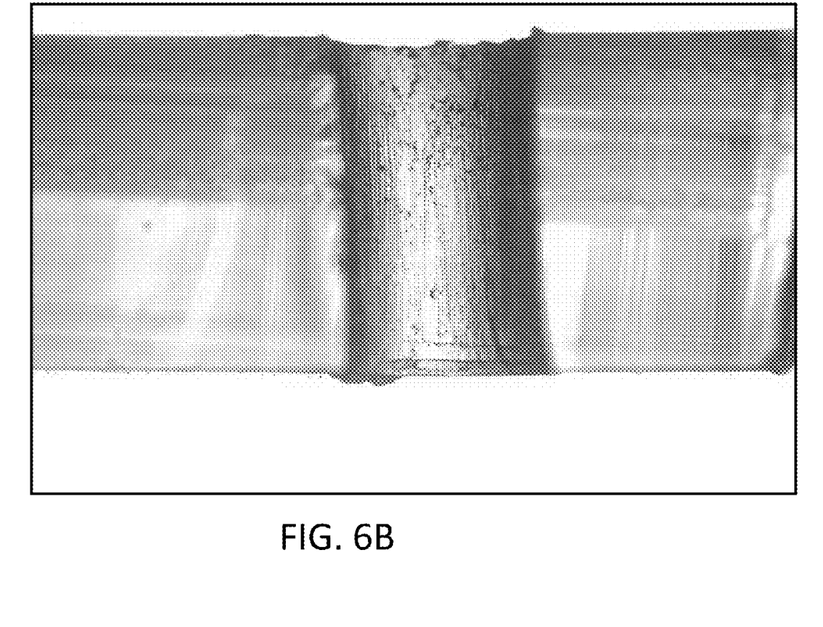

FIGS. 6A and 6B are comparative micrographs showing a borehole in a lens before and after polishing. More specifically, the illustrations are 25× microtome cross sections through drilled holes in finished lenses made from Teijin L 1250 ZT resin. FIG. 6A shows the borehole without polishing. FIG. 6B shows the borehole after polishing. Polishing included reaming with five bundled abrasive wavy fibers for 10 strokes, with GRAY 400, Abralon SIC 0.18, CR-5, C/M 500 Grit-W/C 333.

Figure 7A:
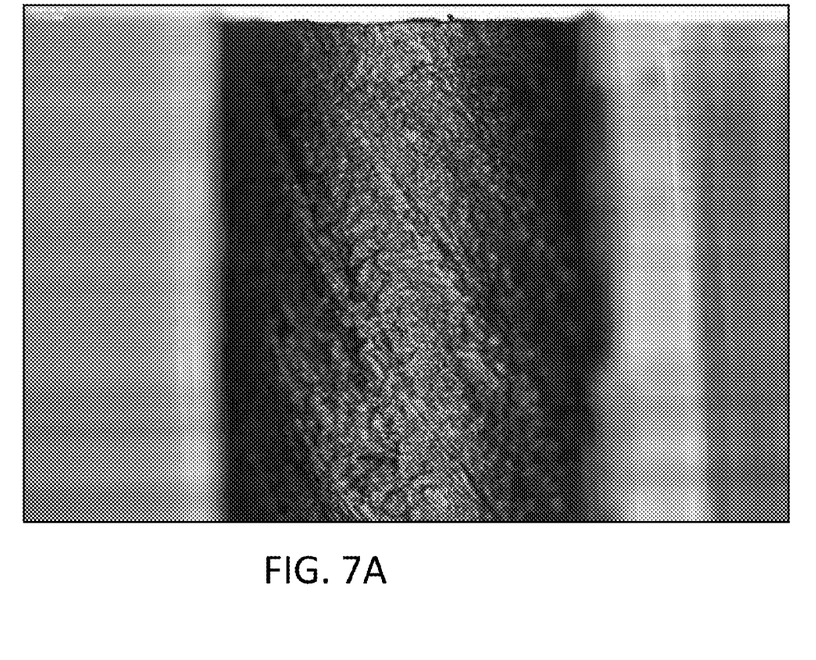
FIGS. 7A and 7B are micrographs showing a borehole in a lens made from a different material, with FIG. 7A showing the borehole before polishing and FIG. 7B showing the borehole after polishing.
Figure 7B:
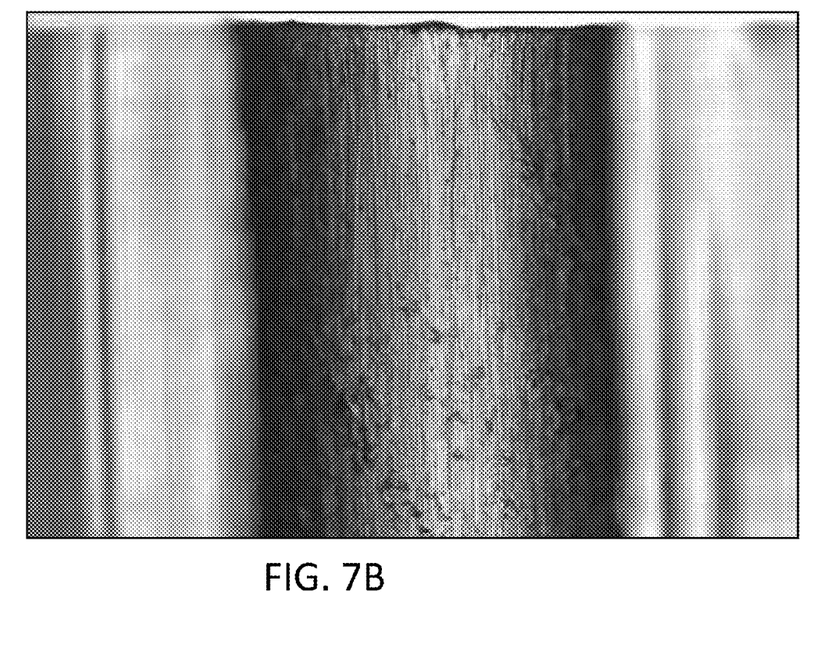

FIGS. 7A and 7B are further comparative micrographs showing a borehole in a lens before and after polishing. More specifically, the illustrations are 25× microtome cross sections through a 0.098 inch (2.5 mm) drilled hole in a 0.195 inch (5 mm) thick polycarbonate plate made from SABIC 7220 resin. FIG. 6A shows the borehole without polishing. FIG. 6B shows the borehole after polishing. Polishing included reaming with five bundled abrasive wavy fibers for 25 strokes, with 320 grit wavy fibers of 0.022 inch diameter.

Flat or wavy fibers may be selected which have a diameter in the range of about 15% to 95% of the bore hole diameter. Fibers may be used individually for cleaning or polishing. To improve efficiency, several fibers may be used together, for example between 2 and 7 fibers may be bundled together. Bundled fibers increases the abrasives surface area so that the entire bore hole surface can be contacted with each polishing stroke. Within a bundle, the individual fibers have a diameter in the range of about 15% to 25% of the bore hole diameter. When forced through the bore hole or against the bore hole wall, wavy fibers have the ability to compress against each other, flattening out the wave, thereby providing a "soft filing" effect.

Drilling through an amorphous thermoplastic such as polycarbonate induces surface stresses. Unlike a cutting operation, drilling through a polymer involves taking the polymer to its failure point by shearing the pieces off of the bulk material. Shearing creates stress in the adjacent remaining bulk material. During use, these residual stresses are compounded by the flexing and compressive forces acting on drill-site by the frame. The rough surface morphology acts as a propagation point for micro-cracks that result from concentrated stress-points. The process of polishing accomplishes two objectives. First, it reduces the surface stress in polycarbonate by physically removing the stressed-layer, which reduces the overall stress-value. Secondly, polishing the surface alters the morphology from rough (with micro-cracks within the top layer) to a smooth where the "propagation channels" have been largely eliminated. By analogy a notch acts as the precipitation point for failure in a notch test. In the absence of the notch, the sample may not fail/break, just deform. The combination of removing the stressed layer and removing the propagation channels improves the overall performance of drilled bore holes in polycarbonate for use in rimless spectacles.

Having described preferred implementations for lens manufacturing and treatment, materials used therein and methods for processing the same (which are intended to be illustrative and not limiting), it is noted that modifications and variations can be made by persons skilled in the art in light of the above teachings. It is therefore understood that changes may be made in the particular implementations disclosed which are within the scope and spirit of the present principles as outlined by the appended claims. Having thus described the present principles with the details and particularity required by the patent laws, what is claimed and desired protected by Letters Patent is set forth in the appended claims.

What is claimed is:

1. A method for producing a rimless spectacle lens with a resistance to stress-induced cracking comprising:
   providing an optical grade thermoplastic lens;
   drilling a borehole in the lens; and
   soft-filing a borehole surface with an abrasive wire including:
   a wire substrate, and
   abrasive particles embedded on the wire substrate.

2. The method of claim 1, wherein said lens comprises a polycarbonate lens including a coating layer;
   wherein the borehole is drilled through the lens and coating layer;
   wherein the substrate is made from a synthetic thermoplastic; and
   wherein the abrasive particles have a Mohs hardness in the range of 7.5 to 9.5, and a grit size between 100 and 800 as measured by grit mesh, whereby the soft-filing step cleans out loose material, polishes coarse protrusions, and removes a portion of the drill induced stress layer in the polycarbonate lens.

3. The method of claim 2, wherein prior to the soft-filing step, the method additionally includes the step of:
   selecting crimped abrasive wires having a diameter between 15% and 25% of the borehole diameter; and
   bundling between 2 and 7 abrasive wires together;
   wherein the soft-filing step includes soft-filing a borehole with a bundle of abrasive wires.

4. The method of claim 1, wherein the filing step renders a surface texture with a higher degree of consistency and resilience to torque stress applied on the borehole surface, thereby reducing the incidence and propagation of cracks in the lens.

5. The method of claim 4, wherein the borehole and a nearest periphery of the lens define a land having a length that is at most 20% of a maximum lens length of the lens.

6. The method of claim 5, further including the step of installing a mounting pin in the borehole, wherein the filing step renders a surface texture with a higher degree of consistency and resilience to torque stress applied by the mounting pin during use of rimless spectacles, thereby reducing the incidence and propagation of cracks into the land.

7. The method of claim 6, wherein the abrasive particles have a Mohs hardness between about 7.5 and 10.0.

8. The method of claim 7, wherein the maximum diameter of the abrasive wire is between 15% and 95% of the borehole diameter.

9. The method of claim 8, wherein the abrasive particles are composed of a material selected from the group consisting of aluminum oxide, silicon carbide, diamond and combinations thereof.

10. The method of claim 9, wherein the wire substrate is made from a synthetic thermoplastic material.

11. The method of claim 10, wherein the borehole surface of the soft-filing step includes at least one coating layer.

12. The method of claim 11, wherein the providing step includes:
    edging the periphery of a finished lens blank to form a spectacle lens.

13. The method of claim 12, wherein the providing step includes:
    machining a semi-finished lens blank to form a lens with a particular thickness and with two surfaces finished to specific curves;
    edging the periphery of the machined lens to form a spectacle lens.

14. The method of claim 13, further including the step of:
    utilizing the soft-filed lens to construct rimless spectacles.

15. A device for use in filing an inner-surface of a drilled borehole within an optical grade thermoplastic lens including an edged, elliptical periphery, that is employed in rimless spectacle construction, wherein the borehole and a nearest periphery of the lens define a land having a length that is at most 20% of a maximum lens length, comprising:
    a soft file device comprising a wire substrate and abrasive particles having a hardness greater than the lens coating embedded on the wire substrate and adapted to soft-file a borehole surface within a thermoplastic lens to partially remove a drill induced stress layer.

16. The apparatus of claim 15, wherein the soft file device is configured to render a borehole surface texture with a higher degree of consistency and resilience to torque stress applied by a mounting pin during use of rimless spectacles, thereby reducing the incidence and propagation of cracks in the land.

17. The apparatus of claim 16, wherein the abrasive particles have a Mohs hardness in the range of about 7.5 to about 10.0.

18. The apparatus of claim 17, wherein the maximum diameter of the abrasive wire is between 15% and 95% of the borehole diameter.

19. The apparatus of claim 18, wherein a concentration of the abrasive particles is between 10% and 30% by weight of the soft file device.

20. The apparatus of claim 19, wherein the abrasive particles have a grit size between about 100 and 800 as measured by grit mesh.

21. The apparatus of claim 20, wherein the abrasive particles are composed of a material selected from the group consisting of aluminum oxide, silicon carbide, diamond and combinations thereof.

22. The apparatus of claim 21, wherein the wire substrate is made from a crimped synthetic thermoplastic having a diameter of between 15% and 25% of the borehole diameter, and wherein the soft file device includes between 2 and 7 wire substrates bundled together, wherein the bundle is adapted to compress upon movement through the borehole.

23. An abrasive tool in combination with a workpiece employed to produce a rimless spectacle lens with a resistance to stress-induced cracking comprising:
    an optical grade plastic thermoplastic lens including a borehole;
    an abrasive wire with a linear configuration that is dimensioned to allow the abrasive wire to be drawn through the borehole in an axial direction and to enable soft-filing of a linear section of the borehole including:
    a wire substrate, and
    abrasive particles embedded on the wire substrate.

24. The apparatus of claim 23, wherein the abrasive wire is configured to render a borehole surface texture with a higher degree of consistency and resilience to torque stress when employed on the borehole surface, thereby reducing the incidence and propagation of cracks in the lens.

25. The apparatus of claim 23, wherein the borehole and a nearest periphery of the lens define a land having a length that is at most 20% of a maximum lens length of the lens.

26. The apparatus of claim 25, wherein the lens includes (i) an edged periphery and (ii) at least one coating layer.

27. The apparatus of claim 26, wherein the lens is made from polycarbonate having a Rockwell hardness of about M70, and the coating layer has a Mohs hardness of between 4 and 5, and wherein the abrasive particles have a Mohs hardness of between about 7.5 and about 10.0.

* * * * *

UNITED STATES PATENT AND TRADEMARK OFFICE
CERTIFICATE OF CORRECTION

PATENT NO. : 7,726,808 B1
APPLICATION NO. : 12/469331
DATED : June 1, 2010
INVENTOR(S) : Paresh Kitchloo and Russell F. Weymouth, Jr.

It is certified that error appears in the above-identified patent and that said Letters Patent is hereby corrected as shown below:

Column 2, line 15, delete "ME" and insert --THE--.

Signed and Sealed this

Tenth Day of August, 2010

David J. Kappos
*Director of the United States Patent and Trademark Office*